Figure 1:
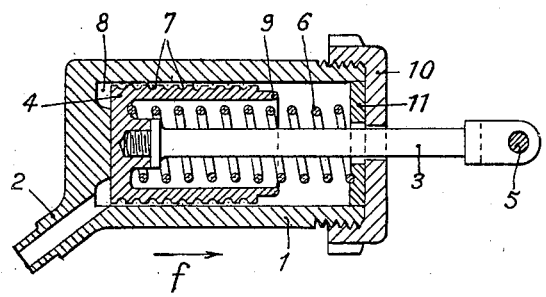

July 28, 1942.   R. L. LÉVY   2,291,243
PNEUMATIC REMOTE CONTROLLED RELEASE
Filed March 30, 1940

Inventor,
R. L. Levy
By: Glascock Downing & Seebold
Attys.

Patented July 28, 1942

2,291,243

UNITED STATES PATENT OFFICE 2,291,243

PNEUMATIC REMOTE CONTROLLED RELEASE

René Lucien Lévy, Montrouge, France, assignor to Société d'Inventions Aéronautiques et Mécaniques S I A M, Fribourg, Switzerland Application March 30, 1940, Serial No. 326,987
In France April 27, 1939

1 Claim. (Cl. 121—38)

It is known that some remote controls have to cause the substantially instantaneous release of the controlled member. When such quick releases are obtained by pneumatic means, it is necessary for the action of the actuating fluid not to be delayed by the friction or the sticking of fluid-tight packings provided in the pistons which exist in the pneumatic channels.

The invention has precisely for its object a pneumatic remote release device which is free from these drawbacks which are prohibitive for some applications, such, in particular, as gun controls.

Assuming, in order to give a concrete idea, that the actuating fluid is introduced, for the controlling action, into a cylinder that contains a piston connected to the member to be controlled, the invention consists in using a piston which has no packings and in only producing the fluid-tightness of the piston in the cylinder at the end of the stroke of the piston, by the contact of said piston with a fixed plastic packing of any appropriate type, carried by the end of the cylinder.

One of the features of this device therefore consists in the fact that the fluid-tightness of the periphery of the piston relatively to the cylinder may be quite relative, thereby dispensing with the use of movable fluid-tight packings which are liable to cause a delay in the control.

This relative fluid-tightness must nevertheless be sufficient for the piston to be projected towards the opposite end of the cylinder when the actuating fluid under pressure is introduced in front of the piston. In order to obtain this result, it is sufficient for the periphery of the piston to be provided with a system of striations, grooves or the like, which are capable of offering a sufficient obstruction to the passage of the compressed air, between the cylinder and the piston, even in the absence of any packing on the latter.

The figure of the accompanying drawing shows diagrammatically a section of a first embodiment of such a device in the case in which the inlet of the compressed fluid (air, for example) is effected in the compartment opposite to the cylinder end through which the piston rod passes.

In this figure:

1 designates the cylinder; 2 a connection intended to be connected to a source of fluid under pressure. The rod 3 of the piston 4 acts on the member to be controlled 5.

The piston is subjected to the action of a spring 6 and its periphery, which is not provided with any packing, is provided with a system of more or less deep, numerous and wide striations 7.

At its opposite end to the compartment 8, the piston terminates in a kind of seat in relief 9.

On the inner wall of the end 10 of the cylinder is fixed a fluid-tight packing 11 of any appropriate nature.

When the pressure fluid is introduced into the compartment 8, it projects the piston in the direction of the arrow f towards the rear end 10. At the end of this stroke, the seat 9 comes into contact with the packing 11 and is pushed firmly into the body of said packing by the actual action of the actuating fluid, so that at this instant a perfect fluid-tightness is produced in the front compartment of the cylinder.

It has therefore been possible to effect the actuation of the controlled member 5 in a substantially instantaneous manner, since the rapidity of the movement of the piston is not dependent on any packing. Owing to the fluid-tightness obtained, the controlled member 5 is kept absolutely stationary, at the end of the stroke, in the position into which it has been brought.

Figure 2:
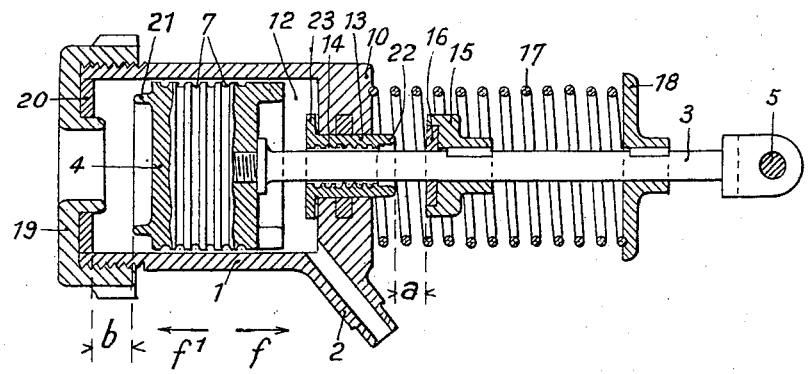

Fig. 2 shows a modification of construction applicable in the case which is the reverse of the previous one and in which the inlet 2 of the actuating fluid is effected in a compartment 12 which is located on the same side as the end 10 through which passes the rod 3 of the piston 4 which is movable in the cylinder 1, the periphery of said piston carrying, as before, a system of striations, grooves or their equivalent 7.

In this embodiment, on the piston rod 3, where it passes through the end 10 of the cylinder, there is fitted a movable sleeve 13, the inner passage of which is provided with striations or their equivalent 14 which produce a relative fluid-tightness between the sleeve and the piston rod.

On the piston rod there is fixed, in an adjustable position, an abutment member 15 in which there is lodged an appropriate packing 16.

A spring 17 bears, on the one hand on the outer wall of the end 10, on the other hand on a second abutment 18 which is also fixed on the piston rod. Said piston rod is attached at its end to the member to be controlled 5.

The end 19 of the cylinder, which is opposite to the inlet tube 2, serves as a housing for a packing 20.

Two circular seats respectively 21 and 22 are provided, one on the front face of the piston 4, the other on the rear face of the sleeve 13, the travel of the latter in the direction of the arrow $f$ being moreover limited by a collar 23.

The mounting of the various elements of the device is such that the distance $a$ between the edge of the seat 22 and the fluid-tight packing 16 with which it co-operates, is smaller than the distance $b$ between the edge of the seat 21 and the fluid-tight packing 20.

The actuating fluid being introduced into the compartment 12 of the cylinder acts to push, on the one hand the piston 4 in the direction of the arrow $f^1$, on the other hand the sleeve 13 in the direction of the arrow $f$ and presses the collar 23 against the end 10 if it were not already pressed thereagainst.

The fluid-tightness of the piston rod, relatively to the sleeve 13, is sufficient to make this movement possible.

Owing to the fact that the distance $a$ is smaller than the distance $b$, the packing 16, which is carried along with the piston rod, comes into contact with the seat 22 before the seat 21 has reached the packing 20.

In the last phase of the movement, the abutment 15 and the sleeve 13 accompany the piston rod, the action of the actuating fluid having the effect of producing absolute fluid-tightness between the seat 22 and the packing 16.

This action of the actuating fluid is still exerted to enhance fluid-tightnes from the instant when the seat 21 has come into contact with the packing 20. At the end of the stroke of the piston, a perfect fluid-tightness is obtained in the compartment 12 of the cylinder. As in the previous example, the actuation of the controlled member 5 has therefore been effected very rapidly, since the piston 4 and its rod 3 slide without appreciable friction within the cylinder 1 and the sleeve 13. Similarly, at the end of the control stroke, the controlled member 5 is kept stationary in its operative position.

In the two devices illustrated, it is sufficient to connect the connection 2 to the exhaust, for the springs, respectively 6 and 17, to return the piston and, with it, the controlled member, to their initial positions.

An additional advantage of such a pneumatic remote controlled release rests in the fact that the absence of packing enables the piston to operate absolutely dry, a fact which is very important in the case in which the control is to be used at low temperatures, owing to the fact that in the known systems, the cold may cause the lubricating oils to congeal and consequently bring about the locking of the piston.

While there is described what is at present considered to be the preferred embodiments of this invention, it will be obvious to those skilled in the art that various changes and modifications may be made therein without departing from the invention, and it is, therefore, aimed in the appended claim to cover all such changes and modifications as fall within the true spirit and scope of the invention.

I claim:

A pneumatic remote controlled release, comprising a pneumatic cylinder, a piston without packing, connected to the member to be controlled, said piston being lodged in said cylinder, a pressure fluid inlet in the compartment of said cylinder which is located on the same side as the piston rod, a sleeve fitted on said rod, means for giving said sleeve a relative fluid-tightness with respect to said rod, a seat on said sleeve, a transverse packing carried by said rod and adapted to be encountered by said seat, a seat carried by the face of the piston opposite said rod, and a transverse packing fixed on the end of the cylinder opposite said rod, the arrangement being such that the seat of the sleeve is in contact with its packing before the seat of the piston comes into contact with its own packing.

RENÉ LUCIEN LÉVY.